(12) United States Patent
Huffman et al.

(10) Patent No.: US 9,287,725 B2
(45) Date of Patent: Mar. 15, 2016

(54) CIRCUIT AND METHOD ENABLING THE SHARING OF A BATTERY CHARGER WITH MULTIPLE BATTERIES

(75) Inventors: James Earl Huffman, Keller, TX (US); Johnny Lyman Wise, Irving, TX (US)

(73) Assignee: PULSETECH PRODUCTS CORPORATION, Southlake, TX (US)

( * ) Notice: Subject to any disclaimer, the term of this patent is extended or adjusted under 35 U.S.C. 154(b) by 891 days.

(21) Appl. No.: 13/450,956

(22) Filed: Apr. 19, 2012

(65) Prior Publication Data

US 2012/0299533 A1 Nov. 29, 2012

Related U.S. Application Data

(60) Provisional application No. 61/488,907, filed on May 23, 2011.

(51) Int. Cl.
*H02J 7/00* (2006.01)

(52) U.S. Cl.
CPC ............. *H02J 7/0024* (2013.01); *H02J 7/0013* (2013.01); *H02J 7/0021* (2013.01)

(58) Field of Classification Search
CPC ...................................... H02J 7/0024
USPC .......................... 320/124, 126, 104
See application file for complete search history.

(56) References Cited

U.S. PATENT DOCUMENTS

| | | | | |
|---|---|---|---|---|
| 5,640,078 | A * | 6/1997 | Kou et al. | 320/124 |
| 5,652,499 | A * | 7/1997 | Morita et al. | 320/112 |
| 5,808,444 | A * | 9/1998 | Saeki | H01M 10/425 320/117 |
| 6,236,552 | B1 * | 5/2001 | Hattori | H01H 47/04 361/154 |
| 7,782,011 | B2 * | 8/2010 | Nishida | H02J 7/0077 320/112 |
| 7,872,443 | B2 * | 1/2011 | Ward | H02J 7/35 320/103 |
| 8,436,583 | B2 * | 5/2013 | Guang | H02J 7/0006 320/119 |
| 2008/0169785 | A1 * | 7/2008 | Kim | 320/124 |

* cited by examiner

*Primary Examiner* — Richard V Muralidar
(74) *Attorney, Agent, or Firm* — Gardere Wynne Sewell LLP; Andre M. Szuwalski

(57) ABSTRACT

A circuit includes a first port configured for connection to a battery charger and a plurality of second ports each configured for connection to a battery to be charged. The circuit includes a corresponding switchable circuit path provided between the first port and each of the second ports. A control circuit is configured to selectively activate the switchable circuit paths so as to connect the first port to selected ones of the second ports for charging of the connected battery by the connected battery charger.

26 Claims, 5 Drawing Sheets

CIRCUIT AND METHOD ENABLING THE SHARING OF A BATTERY CHARGER WITH MULTIPLE BATTERIES

PRIORITY CLAIM

This application claims priority from U.S. Provisional Application for Patent No. 61/488,907 filed May 23, 2011, the disclosure of which is hereby incorporated by reference.

TECHNICAL FIELD

The present invention relates to battery charging systems, and in particular to a system which permits multiple batteries to share a single charger.

BACKGROUND

There are a number of applications where multiple batteries need to be charged. In most cases, however, only a single battery charger is available. In such cases, the user must individually connect each battery to the charger. There is a need in the art for an easier solution which obviates the need for the user to make the battery connections. Ideally, an interface between a single charger and multiple batteries could be provided which automates the connection and charging actions. The present invention provides such an interface.

SUMMARY

In an embodiment, a circuit comprises: a first port configured for connection to a battery charger; a second port configured for connection to a battery to be charged; a switchable circuit path provided between the first port and the second port; and a control circuit operable to selectively activate the switchable circuit path so as to connect the first port to the second port for charging of the connected battery by the connected battery charger.

The circuit includes a voltage detection circuit operable to detect a voltage at the second port due to the presence of a connected battery and supply an indication of said detected voltage to the control circuit. The detected voltage is processed and used to control operation of the circuit. For example, selective activation of the switchable circuit path includes deactivation in response to a decrease in detected voltage. Furthermore, selective activation includes inhibiting activation if the detected voltage is less than an under-voltage threshold, or exceeds an over-voltage threshold, or indicates a reverse polarity connection of the battery.

The circuit further includes a current sensing circuit operable to detect a current supplied at the first port from the charging circuit and supply an indication of said sensed current to the control circuit. The sensed current is processed and used to control operation of the circuit. For example, selective activation of the switchable circuit path includes deactivation in response to a decrease in sensed current.

In a preferred implementation, the second port comprises a plurality of second ports, each second port configured for connection to a battery to be charged. The switchable circuit path further comprises a plurality of switchable circuit paths corresponding to said plurality of second ports. Selective activation of the switchable circuit paths is made in a sequential manner so as to sequentially connect the first port to each one of the second ports having a connected battery. Second ports without a connected battery are skipped in the sequential activation of switchable circuit paths.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
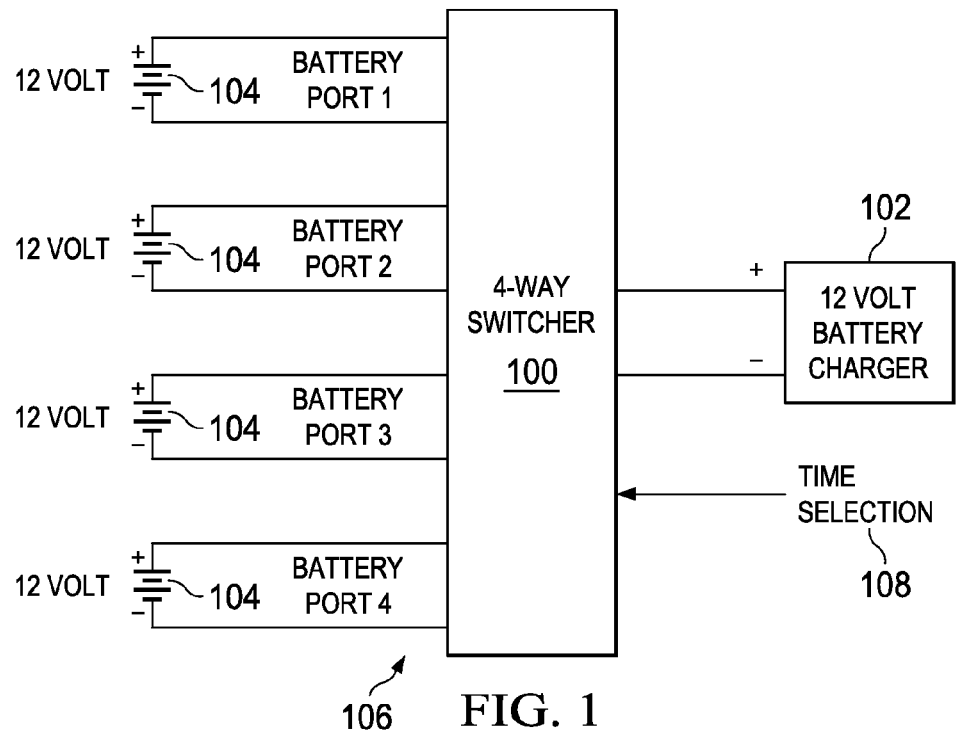
FIG. 1 is a block diagram of a battery charger sharing circuit.

Reference is now made to FIG. 1 which shows a block diagram of a battery charger sharing circuit 100 referenced in a preferred implementation as a 4-Way Switcher. The circuit 100 operates to share a single battery charger 102 with multiple (for example, four) batteries 104. The illustration of a 12-Volt charger is an example only, it being understood that the circuit is operable with respect to any suitable voltage level for the charger 102 and batteries 104. Furthermore, the illustration of four battery ports 106 for the circuit 100 is merely illustrative of the product configuration, it being understood that other configurations could provide for two, six, eight or perhaps twelve battery ports.

Only one battery port 106 will be connected through the circuit 100 to the battery charger 102 at any given time. Each battery port 106 is preferably connected by the circuit 100 to the battery charger 102 for a set length of time. In an exemplary implementation, for example, the connection time is 10 minutes±10 seconds. This time period will be understood to be just an example. Alternative implementations could use any arbitrary time period. The time period should be selected to be sufficient in length such that the charger 102, operating in a "smart" mode of operation understood to those skilled in the art, will be able to analyze the state of the connected battery 104 and begin operations to charge the battery. A further alternative implementation provides for user selection 108 of the connection time period per battery.

In a preferred implementation, the batteries 104 are lead acid type batteries and the charger 102 is designed for the charging of such lead acid batteries. It will be understood the circuit 106 does not care about the type of battery and type of charger that are connected, and will work equally well, for example, with NiCad batteries and a NiCad charger, or with any other suitable combination of battery and battery charger (i.e., any suitable re-chargeable battery and corresponding charger known in the art). The circuit 100 is primarily intended for use with a lead acid battery charger of the 12 volt or 6 volt variety. It will be understood that chargers of other voltages for batteries with other chemistries could be used as well. For example, a 24V charger could be used provided the circuit 100 is capable of handling the required load. The circuit 100 can be designed for operation and supplied in two formats, one for a relatively lower voltage battery charger connection and one for a relatively higher battery charger connection. In a preferred implementation, the circuit 100 is configured to support conduction of at least 10 amperes from the battery charger 102 to each battery 104 that is connected to a battery port 106.

Figure 2:
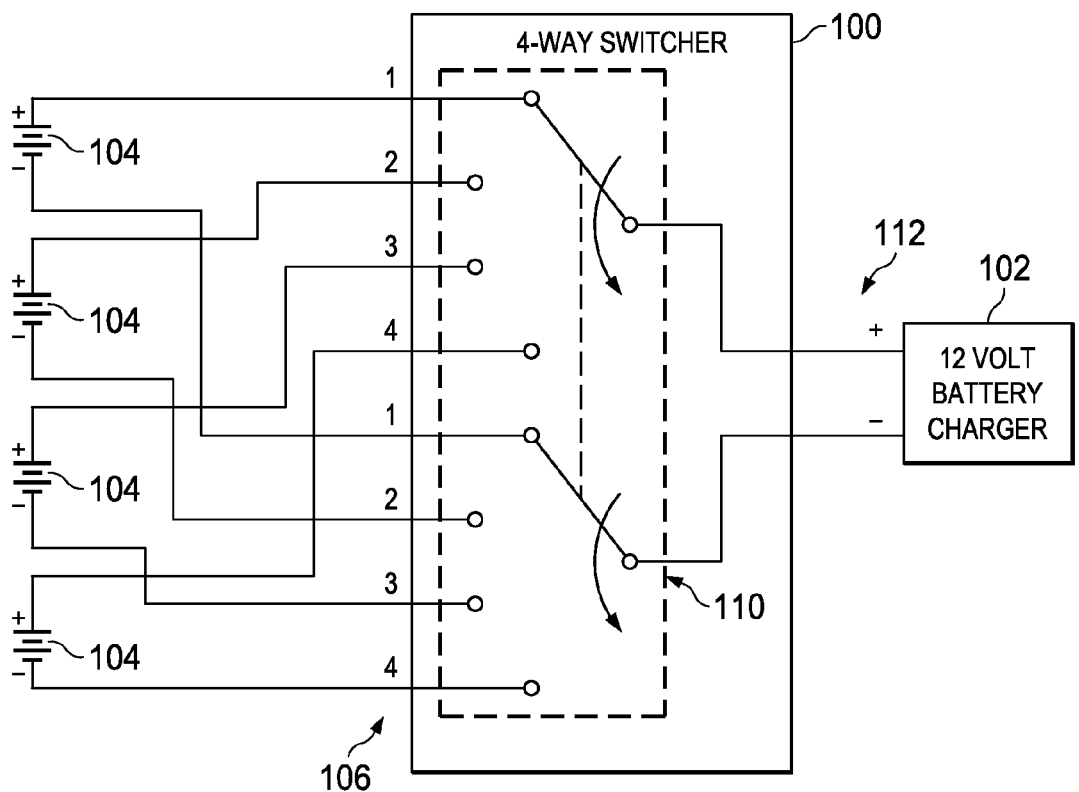
FIG. 2 illustrates the functional concept of operation for a switching circuit.

Reference is now made to FIG. 2 which illustrates the functional concept of operation for the circuit 100. The switching operation function is illustrated in FIG. 2 using a dual 4-pole ganged rotary switch 110 whose connections present switchable circuit paths that are cycled through under the control of a control circuit, such as a microcontroller (not shown in FIG. 2, but see FIG. 7). This illustration of a rotary switch is exemplary only. A rotary switch 110 provides only one possible switching circuit. Separate relay circuitry, as shown below in FIG. 7, could alternatively be used under the control of a suitable control circuit. Still further, semiconductor transistor analog switching circuitry could instead be used under the control of a suitable control circuit. It is important that the type of switching circuitry used be rated for expected current and voltage when the battery charger 102 is connected and one or more batteries 104 to be charged. To ensure protection of the control circuit, it is preferred that a high DC resistance be provided between the control circuit and any charge path for the switching circuitry (a charge path conductor or selectively activated switchable circuit path as described herein), such resistance being, for example, greater than 1.0 Megohm.

The control circuit operates to control the switching operation so as to sequentially connect the battery charger 102 (coupled to the circuit 100 at input port 112) to each of the batteries 104 through its corresponding battery port 106 using a selectively actuated switchable circuit path and maintain that circuit path connection for a certain length of time suited to support detection of the battery 104 by the charger 102, analysis of the battery condition by the charger, and commencement of an appropriate charging operation by the charger.

In operation of the circuit 100, when a battery 104 is not connected to a given battery port 106, the circuit functions in a manner so as to identify this condition and skip the connection of the battery charger 102 to that port. As an example, the circuit 100 senses whether a battery 104 is connected to the port 106, and if no detection of a battery is sensed after a certain threshold time period (for example, a maximum of 3 seconds), then the circuit 100 moves on to a next port and skips connection to the port where no battery is present. When a battery 104 is detected as being connected to a given battery port 106, the circuit 100 makes a connection between the port and the connected battery charger 102 at port 112. If multiple batteries 104 are detected as connected to corresponding multiple ports 106, the circuit 100 will selectively and sequentially make a connection between each port and the connected battery charger.

In the event a battery 104 is disconnected from a battery port 106 while being charged, the circuit 100 may in one mode of operation continue to provide a connection of that battery port to the charger for the remaining charging time (for example, the remainder of the 10 minute charging period). However, if the charger 102 includes a "smart" operating functionality that will cause the charger to turn off when it senses that the battery has been removed, the circuit 100 will function to sense whether battery port 106 voltage drops below a threshold (for example, to <1.0 Vdc±) due to the charger turning off, and the circuit will then switch operation to the next battery port in the connection sequence, and make a connection between that battery port and the charger.

It would be desirable to have the circuit 100 automatically change battery ports in the event of a battery 104 disconnection, even if the battery charger 102 does not have the "smart" operating functionality that causes the charger to turn off when it senses that the battery has been removed. One difficulty with this implementation, where the battery charger 102 continues to supply charging voltage, is having the circuit 100 be functionally operable, if a battery 104 is removed, to discern the battery voltage from the charger voltage. If the charger 102 continues to output a voltage after the battery 104 is removed, the circuit 100 may not be able to determine from circuit analysis and sensing to detect the disconnection of the battery. To overcome this issue, the circuit 100 supports a sensing operation that can detect the application of charger current into the battery on the charger side of the circuit's switching relay. If the detected current falls to a level below a preset threshold, this would indicate a disconnection of the battery from the port, and the circuit 100 operates in response thereto by changing to connect to the next port 106 in the sequence to the battery charger 102.

The current sensing method as described above presents two other challenges. First, its output to the micro controller has to be isolated from the charger. Second, the current sensing must have a long integration time to account for chargers 102 which include functionality known to those skilled in the art to supply desulfating current pulses after having turned off the application of DC charge current.

In operation, the circuit 100 is essentially transparent (as is practical) with regard to the connection between the charger 102 and each of the batteries 104. The DC resistance from the + charger terminal (at input 112) to the + battery terminal (at any battery port 106) is preferably less than 0.05 ohms. Likewise, the DC resistance from the − charger terminal (at input 112) to the − battery terminal (at any battery port 106) is preferably less than 0.05 ohms. Those requirements are satisfied, for example, if 10 amperes are flowing through the circuit 100 with respect to a connected battery 104 and there is less than a 0.5 Vdc drop across the switching circuit.

Figure 3:
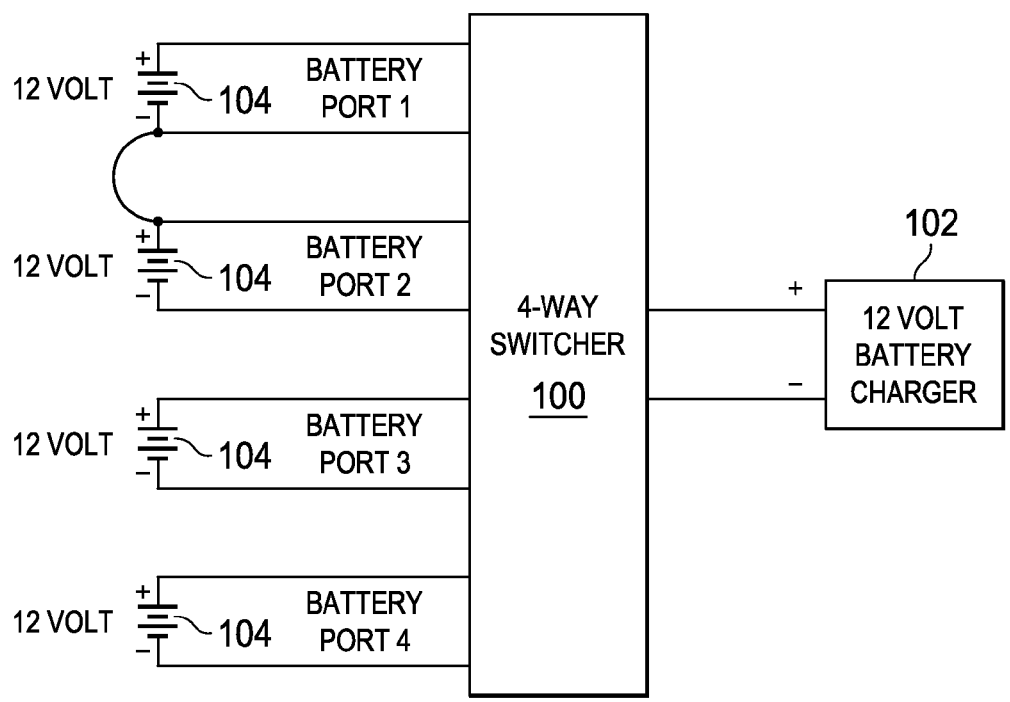
FIGS. 3-5 illustrate circuit connection to various configurations of series connected batteries.
Figure 4:
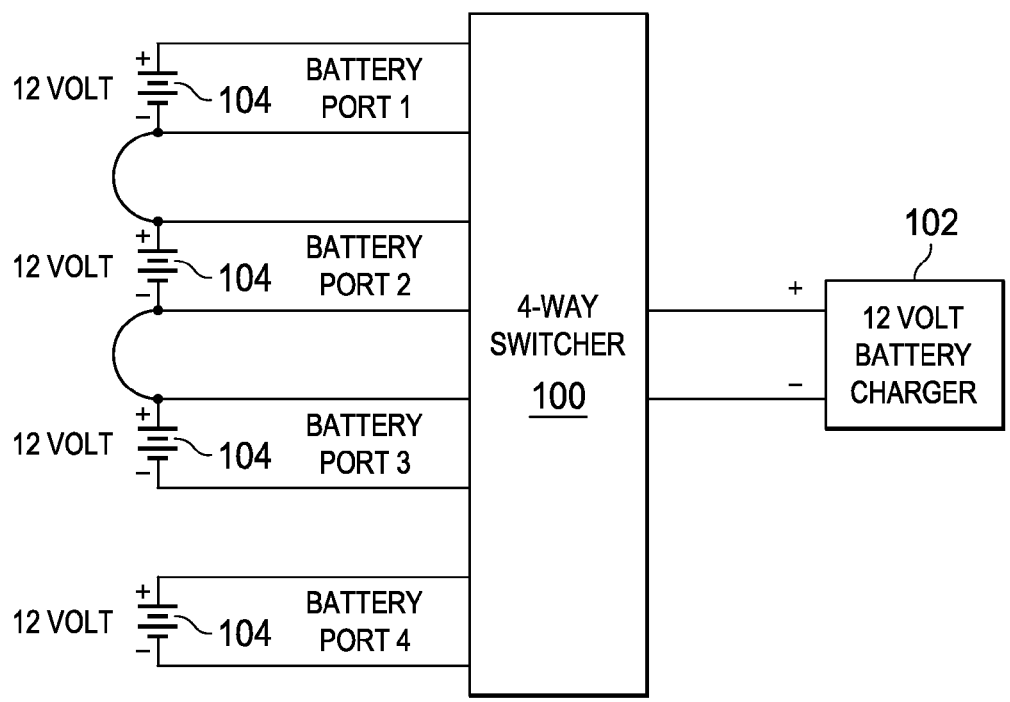
Figure 5:
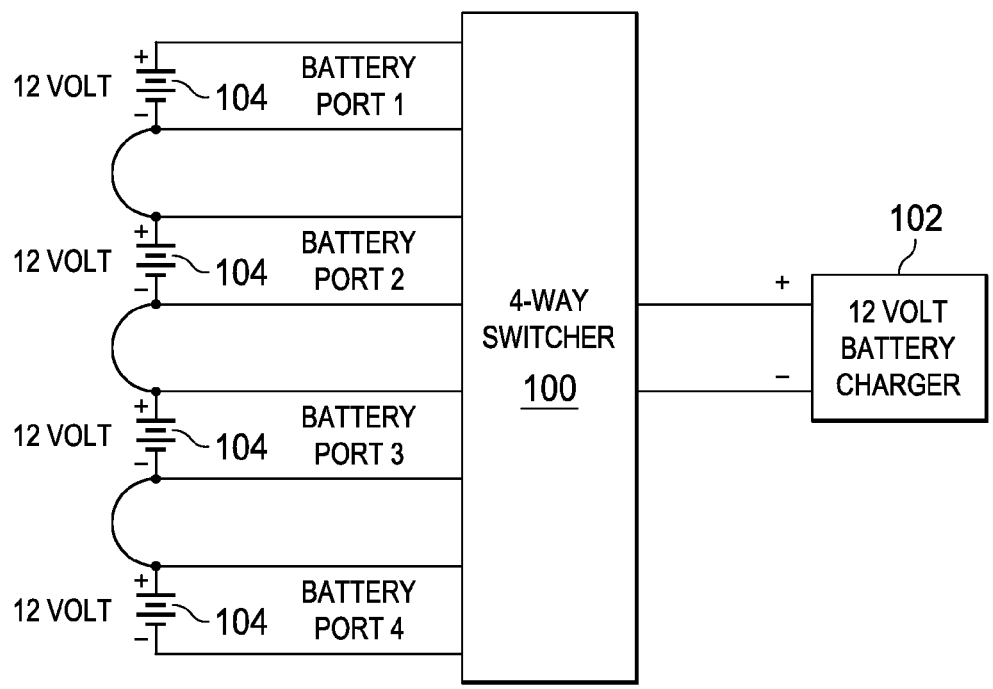

The circuit 100 is capable of charging individual batteries 104 whether those batteries are separately provided and individually connected as shown in FIGS. 1 and 2, or alternatively are provided in a series connected string and connected as a group as shown in FIGS. 3, 4, and 5. FIG. 3 shows two batteries connected in series, with those batteries connected to the first two ports 106 of the circuit 100, and two other batteries individually connected to the last two ports of the circuit. FIG. 4 shows three batteries connected in series, with those batteries connected to the first three ports 106 of the circuit 100, and one other battery individually connected to the last port of the circuit. FIG. 5 shows four batteries connected in series, with those batteries connected to the ports 106 of the circuit 100. It will be noted that even with the series connected batteries, the ports 106 with separate + and − connection terminals provide the circuit 100 with the capability of individually connecting to and charging those batteries. In other words, there is no common ground connection between the individual battery ports. Both the positive and negative terminals of each battery port 106 are independently switched by the circuit 100 to the charger 102.

Figure 6:
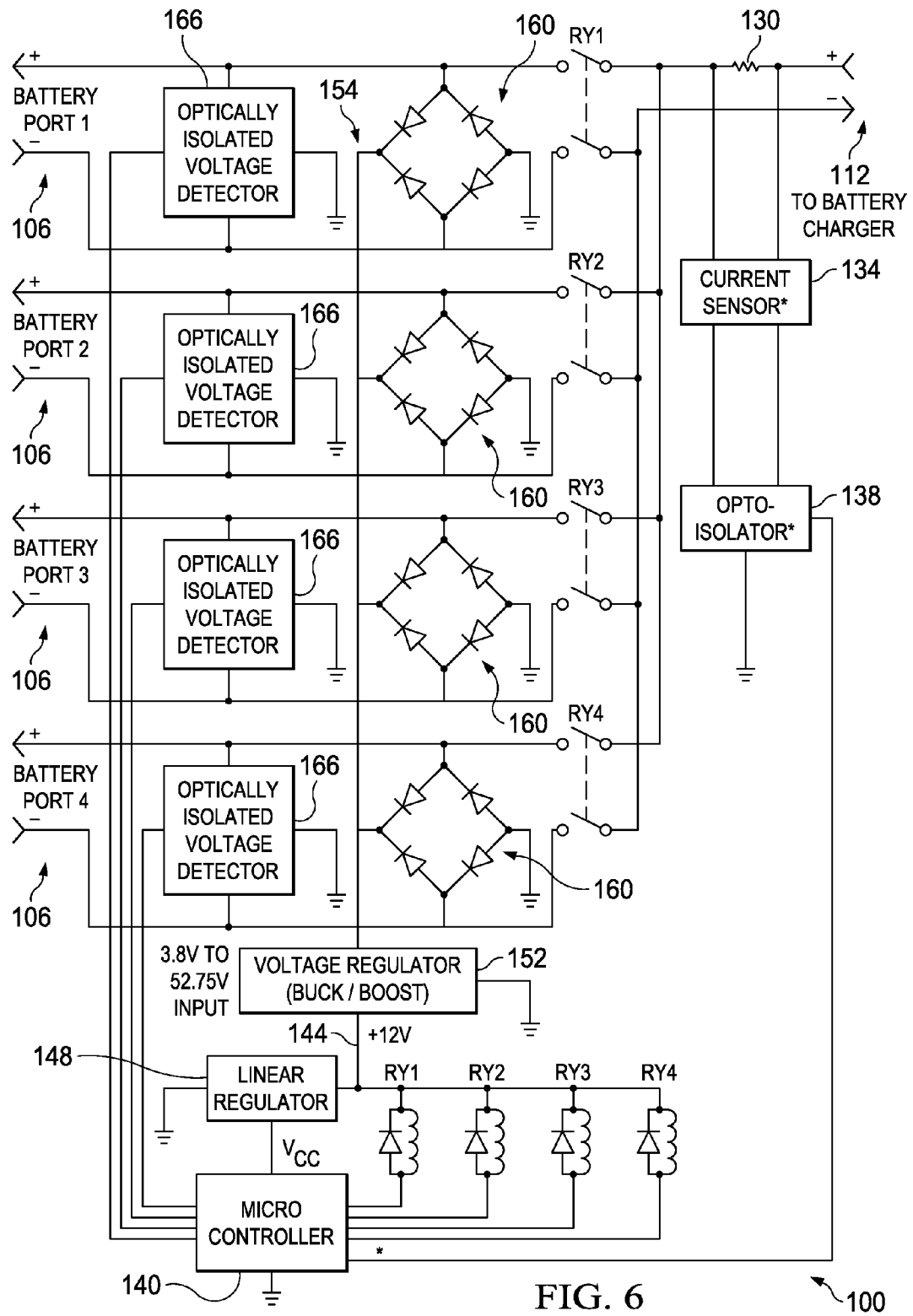
FIG. 6 illustrates a block circuit diagram of the switching circuit.

Reference is now made to FIG. 6 which illustrates a block circuit diagram of the circuit 100. The input port 112 of circuit 100 is coupled through current sensing resistor 130 to a set of relays RY1-RY4. The relays RY are of the double-pole single-throw (DPST) type and include a switching portion and coil-activation portion as understood in the art. The switching portion of each relay circuit RY includes a pair of input terminals coupled to the battery charger through the input port 112 and a pair of output terminals coupled to one of the battery ports 106. Those skilled in the art recognize that the relay-type DPST switching configuration of the circuit 100 could alternatively be implemented with a controlled solid state transistor analog switch configuration.

A current sensing circuit 134 is coupled to measure a voltage drop across the sense resistor 130 and generate an output signal indicative of the sensed voltage. This output signal may comprise a digital output indicating sensing by the circuit 134 of a current through resistor 130 in excess of a certain threshold. The output signal concerning sensed current is passed through an opto-isolator circuit 138 to an input of a micro-controller 140. The opto-isolator circuit 138 functions to isolate in current and voltage the micro-controller 140 from the current sensing operation. It will be noted, as indicated by the "*" in FIG. 6, that the current sensing and passing circuitry is optional.

The micro-controller 140 includes a plurality of outputs coupled to the coil-activation portions of the set of relays RY1-RY4. The coil-activation portions comprise a parallel connection of an inductive coil (for the solenoid of the relay) and diode coupled between a positive supply node 144 and the control output of the micro-controller 140. It will accordingly be understood that the micro-controller 140 includes suitable low-side driver circuitry which can be actuated under micro-controller control to actuate coil-activation portions of any one of the relays RY1-RY4.

A linear regulator circuit 148 is coupled to the positive supply node 144 and is operable to generate a regulated supply voltage for the micro-controller 140. Linear regulator circuits of this type are well known to those skilled in the art.

The positive supply node 144 is at the output of a voltage regulator circuit 152. The regulator is preferably of the buck/boost type and is configured to produce a regulated voltage from the voltage input on node 154. The voltage at node 154 is obtained from the battery ports 106. In other words, the voltage at node 154 is obtained from the batteries 104 which are connected to the battery ports and/or from the battery charger through one of the actuated relays RY1-RY4. A diode bridge circuit 160 is provided for each battery port 106, with each diode bridge circuit having an input connected to a battery port 106 and an output connected to the node 154. A buck/boost type regulator 152 is used because the voltage at node 154 is variable dependent on the charge state of the connected batteries as well as the connection configuration of the connected batteries. The regulator 152 may accordingly have to operate in buck mode in some cases and in boost mode in other cases in order to generate the desired voltage level at the positive supply node 144. Voltage regulator circuits of this type are well known to those skilled in the art.

Thus, the micro-controller 140 and relays RY1-RY4 of circuit 100 are capable of being powered either from the connected battery charger at port 112 or alternatively from one of the batteries which is connected to any of the included battery ports 106. In a preferred implementation, power is provided from the battery port 106 associated with a connected battery having with the highest state of charge (highest voltage). It should be recognized that this does not necessarily have to be the battery that is currently being charged (i.e., the battery connected to a battery ports whose associated relay RY is currently activated by the micro-controller 140). The reason for this is because the battery currently being charged may be in such poor condition that its voltage under charge is less than voltage of another connected battery that is not currently being charged. When the battery under charge has the highest state of charge (highest voltage), this battery connection port 106 for that battery is the source of the power supply (in this case the power supply will actually be the charger itself which is connected to that port). But when this is not true, and the charger is working to charge a poor condition battery, the circuit 100 will instead use one of the other connected batteries as the power supply. Still further, when the charger is connected and one of the relays RY is activated, power from the charger can be used for the power supply.

In operation, the circuit 100 is thus powered from any of the batteries connected at the port 106 (not necessarily the battery currently connected to the charger) or from the charger connected at port 112, and further will operate to individually charge one of the connected batteries (using the connected charger), with any combination of batteries being connected, and even when the batteries are connected in series (as shown in any of FIGS. 3-5), wherein the individual charging is accomplished by selectively and sequentially connecting each connected battery to the charger using the relays RY1-RY4 selectively actuated under the control of the micro-controller 140.

The diode bridge 160 functions as a means of isolation which enables the circuit 100 to both charge individual batteries and enable a connected individual battery or the connected charger to supply power to control circuitry and switching circuitry. It is important to note that when two batteries are connected in series (see, for example, FIG. 3), the voltage supplied by the diode bridges 160 will be double the individual battery voltages. When four 12 volt batteries are connected in series (see FIG. 5), the voltage supplied by the diode bridge to the control circuitry could be as high as 50.6 Vdc. The voltage regulator 152 must be rated appropriately to handle the input voltage capable of being supplied from series connected batteries.

The plurality of battery ports 106 are polarity sensitive. A voltage detection circuit 166 is provided for each battery port 106. The voltage detection circuit is coupled across the positive and negative terminals of the battery port 106. In a preferred implementation, each included voltage detection circuit 166 is provided with an opto-isolator circuit (not explicitly shown, but analogous to the circuit 138) so as to isolate an input of the microcontroller from the voltage detection function. The circuitry 166 functions to supply a signal to the micro-controller 140 indicative of the sensed voltage at node the battery ports 106.

The micro-controller 140 is programmed to operate and provide a number of features. For example, with receipt of output signals provided by the voltage detection circuits 166, the micro-controller 140 can detect whether a battery is connected to an individual battery port, whether that battery is connected with the proper polarity, and whether the voltage on the battery is within the desired range. Based on this information, the microcontroller can control a set of visual indicators (not explicitly shown) to provide information to the circuit user. The microcontroller can further selectively control actuation of the relays RY and thus couple the battery charger to batteries at the ports 106.

In the event a battery is connected to an inactive battery port 106 with a reversed battery polarity, this error is detected by the voltage detection circuit 166 and the micro-controller 140 will function to control operation of the circuit 100 in a protection mode. In this protection mode, the micro-controller 140 will not actuate the corresponding one of the relays RY to connect the battery port 106 (with the reverse polarity connected battery) to the battery charger through input port 112. Thus, for example, in the sequential operation mode the controlled circuit path through the relays RY for the battery port 106 with the reverse connected battery is skipped in the charge sequence, with sequential charging operation moving on to the next properly connected battery. This operation ensures that if a battery is reverse connected to an inactive port, its further connection to the battery charger through the relays RY is prevented. Thus, the battery charger coupled to port 112 used need not have its own reverse polarity detection circuitry in order to operate with the circuit 100. This permits a user to utilize a less expensive charger and rely on intelligence of the circuit 100 for reverse battery polarity detection.

If a battery is connected to an inactive battery port the voltage detection circuit 166 operates to detect the terminal voltage of the battery and report that information to the micro-controller 140. If the detected terminal voltage of the connected battery is less than 1.0 Vdc±0.2 Vdc, the micro-controller 140 controls operation of the circuit 100 to prevent the connection of that under-voltage battery to the battery charger. Thus, for example, in the sequential operation mode the controlled circuit path through the relays RY for the battery port 106 with the under-voltage connected battery is skipped in the charge sequence, with sequential charging operation moving on to the next properly connected battery.

If a battery is connected to an inactive battery port the voltage detection circuit 166 operates to detect the terminal voltage of the battery and report that information to the micro-controller 140. If the detected terminal voltage of the connected battery is greater than 18 Vdc±0.5 Vdc, the micro-controller 140 controls operation of the circuit 100 to prevent the connection of that over-voltage battery to the battery charger when the circuit 100 is designed for operation in connection with a battery charger for 6 or 12 volt batteries. Thus, for example, in the sequential operation mode controlled circuit path through the relays RY for the battery port 106 with the over-voltage connected battery is skipped in the charge sequence, with sequential charging operation moving on to the next properly connected battery.

In response to the detected presence of properly connected batteries, the micro-controller 140 implements a sequential selection operation in which the controlled circuit paths through the relays RY are selectively and sequentially activated, one at a time, to connect each properly connected battery through to the battery charger so as to have that battery receive charge current.

The charge current is sensed by the sense resistor 130 and current sensor 134. Information on the sensed current is fed back to the micro-controller 140 through isolator 138 and this information is used in accordance with the programming of the micro-controller 140 to control operation of the circuit 100 for charging the connected batteries in accordance with the sequential switching operation. As an example, if the voltage detection circuits 166 initially detect presence of a connected battery and then a charging sequence is initiated, the current sensing circuit 134 can be used to detect a disconnection of the battery (due to a reduction in supplied current) while the battery port 106 is connected through an actuated relay RY and the input port 112 to the battery charger. Responsive thereto the micro-controller 140 can determine that the battery has been disconnected and then advance the relay switching to a next battery in the charging sequence.

The micro-controller 140 is further programmed with the timing of the charging activity. Thus, the micro-controller 140 can be programmed to measure the elapsed time for each sequential step of the charging operation and perform a sequential change when the elapsed time reaches the programmed limit. The limits associated with charging activity can be set, or input 108 by the user.

The micro-controller 140 may further support additional outputs. These additional outputs may comprise status indicator outputs, for example, with one status output provided with respect to each battery port 106. The state of the status indicator provides information regarding the connected battery and the operational mode of the circuit. For example, when the status indicator is in a first state (for example, visually off), this indicates one or more of the following: no battery is connected to the associated battery port; a battery is connected but its terminal voltage is 1.0 Vdc±0.2 Vdc; a battery is connected but its terminal voltage is greater than 18 Vdc±0.5 Vdc; a battery is connected but it has been connected with a reversed polarity. When the status indicator is in a second state (for example, visually continuously illuminated), this indicates that a battery is connected (with proper polarity) and its terminal voltage is ≥1.0 Vdc±0.2 Vdc or ≤18 Vdc±0.5 Vdc. When the status indicator is in a third state (for example, visually flashing illuminated), this indicates in the charging sequence that the associated battery port is currently connected to the battery charger.

The micro-controller 140 is programmed in a manner well known to those skilled in the art to implement the processes described above. Such programming may be by means of software algorithms executed by the micro-controller. It will further be understood that some functions performed by the system need not be effectuated under micro-controller control pursuant to an executing application, but rather may be hardware implemented.

Figure 7:
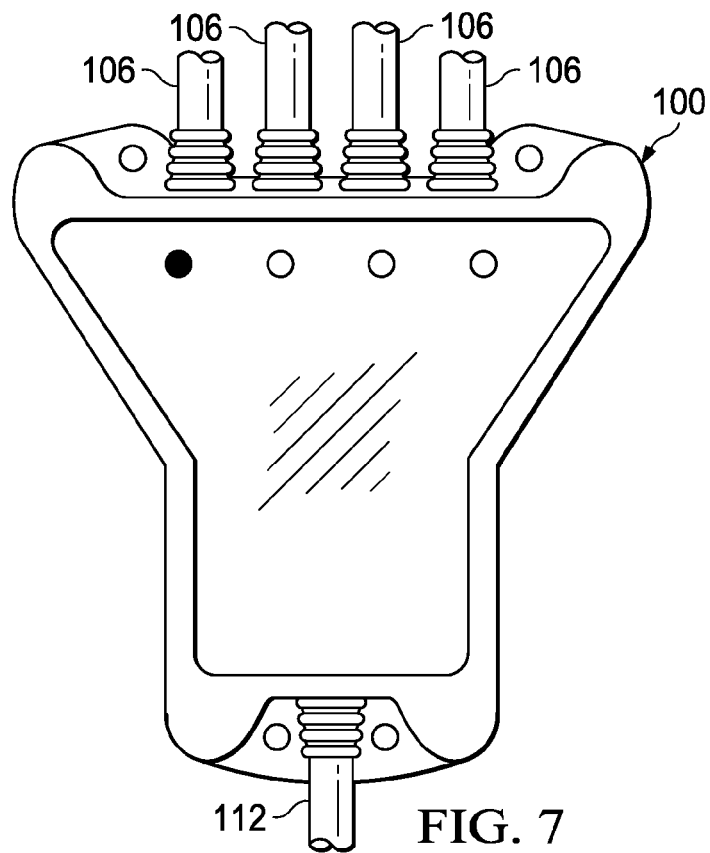
FIG. 7 shows a top view of a product package for the battery charger sharing circuit.

Reference is now made to FIG. 7 which shows a top view of a product package for the circuit 100. Visual status indicators, for example in the form of diodes controlled by the micro-controller 140, are provided on the top of the package adjacent to each output line of a battery port 106. The input port 112 for connection to the battery charger is provided through a separate line on the opposite side of the package.

Figure 8:
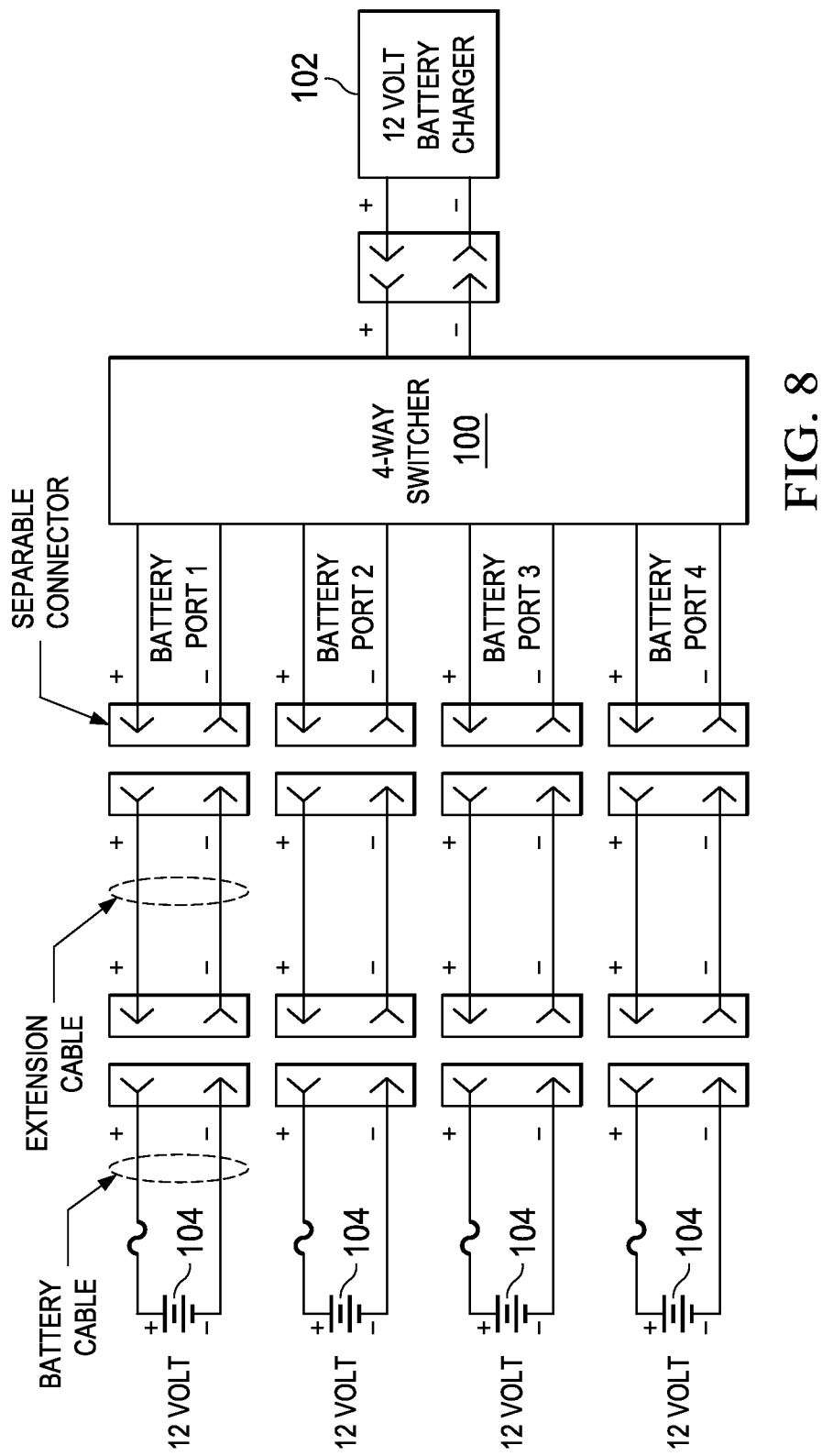
FIG. 8 shows a system level diagram illustrating use of the battery charger sharing circuit.

Reference is now made to FIG. 8 which shows a system level diagram illustrating use of the circuit 100 in an implementation which also uses separable connectors and extension cables at the battery ports 106 for connection to batteries 104.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
a first port having a first positive line and a first negative line configured for connection to terminals of a battery charger;
a second port having a second positive line and a second negative line configured for connection to terminals of a battery to be charged;
a third port having a third positive line and third negative line configured for connection to a further battery to be charged;
a switchable circuit provided between the first port, the second port and the third port, said switchable circuit including a first positive switch selectively connecting the first positive line to the second positive line and a first negative switch selectively connecting the first negative line to the second negative line and a second positive switch selectively connecting the first positive line to the third positive line and a second negative switch selectively connecting the first negative line to the third negative line;
a first power supply rectifier connected between the second positive line and second negative line to generate a first rectified voltage from said battery to be charged;

a second power supply rectifier connected between the third positive line and the third negative line to generate a second rectified voltage from said further battery to be charged;

a power supply circuit coupled to receive said first and second rectified voltages and operable to generate a first regulated supply voltage; and a control circuit powered from the first regulated supply voltage and operable to selectively activate the first and second positive switches and first and second negative switches in the switchable circuit so as to selectively connect the first port to the second and third ports for charging of the connected battery and further battery from the connected battery charger.

2. The circuit of claim 1, wherein the comprising a power supply circuit is further operable to generate a second regulated supply voltage applied to an actuation circuit responsive to the control circuit for selectively activating the first and second positive switches and first and second negative switches in the switchable circuit.

3. The circuit of claim 2, wherein the actuation circuit comprises relay circuits used in connection with selectively activating the first positive and negative switches and the second positive and negative switches in the switchable circuit, said relay circuits powered by said second regulated supply voltage;

wherein the power supply circuit generates the first regulated supply voltage from a voltage presented by at least one connected battery.

4. The circuit of claim 3, wherein said at least one connected battery is the connected battery having a highest charge state.

5. The circuit of claim 1, further comprising:

a voltage detection circuit operable to detect a voltage between the second positive line and the second negative line of the second port due to the presence of the connected battery being in a reverse polarity condition and supply an indication of said detected voltage to the control circuit;

wherein said control circuit is further operable to inhibit activation of the first positive switch and first negative switch in the switchable circuit in response to said indication.

6. The circuit of claim 1, further comprising:

a voltage detection circuit operable to detect a voltage between the second positive line and the second negative line of the second port due to the presence of the connected battery and supply an indication of said detected voltage to the control circuit;

wherein said control circuit is further operable to inhibit activation of the first positive switch and first negative switch in the switchable circuit path if the detected voltage is less than an under-voltage threshold.

7. The circuit of claim 1, further comprising:

a voltage detection circuit operable to detect a voltage between the second positive line and the second negative line of the second port due to the presence of the connected battery and supply an indication of said detected voltage to the control circuit;

wherein said control circuit is further operable to inhibit activation of the first positive switch and first negative switch in the switchable circuit path if the detected voltage exceeds an over-voltage threshold.

8. The circuit of claim 7, where the over-voltage threshold is a voltage in excess of a charging voltage for the connected battery charger.

9. The circuit of claim 1, further comprising a current sensing circuit coupled in series with the first positive line of the first port and operable to detect supply of current from the connected battery charger and supply an indication of supplied current to the control circuit, where the control circuit is operable, in response to a current sensing circuit detection of the absence of the supplied current on the first positive line of the first port, to deactivate the first positive switch and first negative switch in the switchable circuit.

10. The circuit of claim 1, further comprising:

first voltage detection circuitry operable to detect voltage between the second positive line and the second negative line of the second port due to the presence of the connected battery and supply a first indication of said detected voltage to the control circuit;

second voltage detection circuitry operable to detect voltage between the third positive line and the third negative line of the third port due to the presence of the further connected battery and supply a second indication of said detected voltage to the control circuit;

wherein the control circuit operates, responsive to the first and second indications from the first and second voltage detection circuitries, to selectively activate the switches of the switchable circuit in a sequential manner so as to sequentially connect the first port to each of the second and third ports having a connected battery.

11. The circuit of claim 10, wherein each activation of the first positive and negative switches and the second positive and negative switches in the switchable circuit is for a fixed length of time.

12. The circuit of claim 11, wherein the fixed length of time is user programmable in the control circuit.

13. The circuit of claim 10, wherein the control circuit is further operable to skip one of the second and third ports in the sequential selective actuation of the switches in the switchable circuit if the voltage detection circuitry fails to detect voltage at that second or third port due to the absence of a connected battery.

14. The circuit of claim 10, wherein the control circuit is further operable to sense from a decrease in voltage detected by the voltage detection circuitry a disconnection of the connected battery and advance to a next one of the second or third port in the sequential selective actuation of the switches in the switchable circuit.

15. The circuit of claim 1, wherein said first positive switch and first negative switch in the switchable circuit are simultaneously actuated by a relay circuit whose operation is controlled by the control circuit.

16. A circuit, comprising:

a first port having a first positive line and a first negative line configured for connection to terminals of a battery charger;

a second port having a second positive line and a second negative line configured for connection to terminals of a battery to be charged;

a third port having a third positive line and a third negative line configured for connection to terminals of a further battery to be charged;

a first relay switching circuit including first switches selectively connecting the first positive line to the second positive line and connecting the first negative line to the second negative line and a coil operating to control actuation of said first switches;

a second relay switching circuit including second switches selectively connecting the first positive line to the third positive line and connecting the first negative line to the third negative line and a coil operating to control actuation of said second switches;
a first rectification circuit coupled between the second positive line and the second negative line and operating to generate a first rectified voltage;
a second rectification circuit coupled between the third positive line and the third negative line and operating to generate a second rectified voltage;
a first regulator circuit powered from the first and second rectified voltages and configured to generate a first regulated power supply voltage applied to a first terminal of the coils of the first and second relay switching circuits;
a second regulator circuit powered from the first regulated power supply voltage to generate a second power supply voltage;
a control circuit powered by the second power supply voltage and connected to a second terminal of the coils of the first and second relay switching circuits so as to control actuation thereof to connect the first port to the second port for charging of the connected battery by the connected battery charger and connect the first port to the third port for charging of the connected further battery by the connected battery charger.

17. The circuit of claim 16, further comprising:
a first voltage detection circuit operating to detect a reverse polarity voltage between the second positive line and the second negative line of the second port due to the presence of the connected battery being in a reverse polarity condition;
a second voltage detection circuit operating to detect a reverse polarity voltage between the third positive line and the third negative line of the third port due to the presence of the connected further battery being in a reverse polarity condition;
wherein said control circuit further operates to inhibit activation of the switches of the first and second relay switching circuits in response to the detected reverse polarity voltage by a corresponding one of the first and second voltage detection circuits.

18. The circuit of claim 16, further comprising:
a first voltage detection circuit operating to detect a first voltage between the second positive line and the second negative line of the second port due to the presence of the connected battery and generate a first indication of said detected voltage;
a second voltage detection circuit operating to detect a second voltage between the third positive line and the third negative line of the third port due to the presence of the connected further battery and generate a second indication of said detected voltage;
wherein said control circuit further operates compare the detected first and second voltage to a threshold and control activation of the switches of the first and second relay switching circuits, respectively, in response to that comparison.

19. The circuit of claim 18, wherein the threshold is an under-voltage threshold.

20. The circuit of claim 18, wherein the threshold is an over-voltage threshold.

21. The circuit of claim 18, wherein the control circuit operates, responsive to the first and second indications from the first and second voltage detection circuits, to selectively activate the switches of the first and second relay switching circuits, respectively, in a sequential manner so as to sequentially connect the first port to each of the second and third ports having a connected battery.

22. The circuit of claim 21, wherein the control circuit further operates to skip selective activation of the switches of any of the first and second relay switching circuits if the corresponding first and second indication is that no battery is connected to the port.

23. The circuit of claim 21, wherein the control circuit further operates to sense from the first and second indications a decrease in detected voltage indicative of a disconnection of the connected battery and skip selective activation of the switches of any of the first and second relay switching circuits for ports where battery disconnection is detected.

24. The circuit of claim 16, further comprising:
a voltage detection circuit operating to detect a reverse polarity voltage between the second positive line and the second negative line of the second port due to the presence of the connected battery being in a reverse polarity condition;
wherein said control circuit further operates to inhibit activation of the first switches of the first relay switching circuit in response to the detected reverse polarity voltage.

25. The circuit of claim 16, further comprising:
a voltage detection circuit operating to detect a voltage between the second positive line and the second negative line of the second port due to the presence of the connected battery and generate an indication of said detected voltage;
wherein said control circuit further operates to inhibit activation of the first switches of the first relay switching circuit if the detected voltage is less than an under-voltage threshold.

26. The circuit of claim 16, further comprising:
a voltage detection circuit operating to detect a voltage between the second positive line and the second negative line of the second port due to the presence of the connected battery and generate an indication of said detected voltage;
wherein said control circuit further operates to inhibit activation of the first switches of the first relay switching circuit if the detected voltage exceeds an over-voltage threshold.

* * * * *

UNITED STATES PATENT AND TRADEMARK OFFICE
CERTIFICATE OF CORRECTION

PATENT NO.        : 9,287,725 B2
APPLICATION NO.   : 13/450956
DATED             : March 15, 2016
INVENTOR(S)       : James Earl Huffman et al.

Page 1 of 1

It is certified that error appears in the above-identified patent and that said Letters Patent is hereby corrected as shown below:

In the Claims:

At column 9, claim number 2, line number 16, please delete the words "comprising a".

Signed and Sealed this
Seventeenth Day of May, 2016

Michelle K. Lee
*Director of the United States Patent and Trademark Office*